United States Patent [19]

Wason

[11] 3,742,361

[45] June 26, 1973

[54] THRESHOLD EXTENSION PHASE MODULATED FEEDBACK RECEIVER

[75] Inventor: Cameron Bernard Wason, Richardson, Tex.

[73] Assignee: Texas Instruments Incorporated, Dallas, Tex.

[22] Filed: May 28, 1971

[21] Appl. No.: 147,999

[52] U.S. Cl. .................... 325/346, 329/50, 325/377, 325/419, 325/421, 325/423, 325/425, 325/422, 325/433, 325/473, 325/476, 325/477, 331/25

[51] Int. Cl. .............................................. H04b 1/06

[58] Field of Search .................... 325/346, 348, 377, 325/416, 417, 418, 419, 420, 421, 422, 433, 423, 425, 473–477; 329/50; 331/10, 25, 34

[56] References Cited

UNITED STATES PATENTS

| | | | |
|---|---|---|---|
| 2,976,410 | 3/1961 | Schock | 325/433 |
| 3,517,268 | 6/1970 | Webb | 325/419 |
| 3,163,823 | 12/1964 | Kellis et al. | 325/421 |
| 3,461,380 | 8/1969 | Daley | 325/419 |
| 3,204,185 | 8/1965 | Robinson | 325/419 |

*Primary Examiner*—Albert J. Mayer
*Attorney*—Harold Levine, James O. Dixon, Andrew M. Hassell, Melvin Sharp, Rene E. Grossman and Alva H. Bandy

[57] ABSTRACT

In a frequency modulation receiver; (1) a feedback loop returns a control voltage to a voltage controlled oscillator from a bistable switching circuit used as a phase detector; (2) a fast signal acquisition unit of the main feedback loop provides a DC signal of proper sign and voltage to accelerate signal acquisition; (3) an assist means provides high frequency correction at the phase detector to avoid an overload effect occurring in the main feedback loop and a resulting threshold effect in the receiver; and (4) an IF summing circuit increases by a factor of four the amplitude signal-to-noise power ratio of the incoming signal prior to its introduction into the phase detector thereby making it possible for the phase detector to remain above threshold to a lower input signal-to-noise ratio.

8 Claims, 7 Drawing Figures

INVENTOR
Cameron Bernard Wason

Alva H. Bandy
ATTORNEY

THRESHOLD EXTENSION PHASE MODULATED FEEDBACK RECEIVER

BACKGROUND OF THE INVENTION

1. Field of the Invention

This invention relates to electronic receivers and other equipment employing phase lock demodulator loops and, more particularly, to control circuits for improving the performance of these devices with respect to: the minimum threshold level of carrier-to-noise ratio at which the receivers are capable of reproducing a signal; the range of frequency uncertainty over which the receiver will acquire and maintain its "lock" with the input signal; the probability of locking onto the input signal; and the immunity obtained to interference from adjacent channel signals.

2. Description of the Prior Art

A typical phase-lock-loop comprises a multiplier which receives both an FM or PM carrier signal, and the output signal of a voltage controlled oscillator to produce an output signal proportional to the phase difference between the two input signals. The output signal is applied to a loop filter, which provides the voltage control for the voltage controlled oscillator. Thus, it may be said that the loop filter output is a function of the phase difference between the oscillator and the input signal. This phase difference signal is then applied to the voltage controlled oscillator to force its frequency and phase to follow that of the input signal. A typical phase lock receiver will lose the input signal, and fall out of phase lock therewith, when the phase difference between the input and feedback signals become greater than ±90°. Further, the feedback voltage applied to the voltage controlled oscillator tends to decrease per degree of phase difference as the instantaneous phase difference approaches 90°, thereby producing instability as the 90° phase difference limit is approached. Also, the typical phase lock loop is limited with respect to the range of linearity feedback owing to the usual sinusoidal control function which is employed and thus must operate within a rather limited phase difference range to ensure at least 50 percent probability of locking on to the input signal.

SUMMARY OF THE INVENTION

It is an object of the present invention to provide an improved phase lock receiver system.

Another object of the invention is to increase the performance range of phase detection.

A further object is to improve the sensitivity of the receiver system.

Still another object is to reduce the threshold carrier-to-noise ratio in the receiver system.

Yet another object of the invention is to provide for fast acquisition at a lower carrier-to-noise ratio in a phase lock receiver system.

Still yet another object is to increase the probability of lock in a phase lock loop receiver.

Yet another object is to provide for frequency shift caused by transmitter oscillator drift in a phase lock loop receiver system.

Yet a further object is to decrease channel interference in a phase lock loop receiver system.

The novel features of this invention include a frequency modulated receiver having: (*a*) circuitry, hereinafter more fully described, to provide an IF stage of a superheterodyne system with a constant average voltage output equal to the noise free output of a reference oscillator with which it is combined in a summing circuit to artificially increase the amplitude signal-to-noise power ratio by a factor of four to improve the sensitivity of the phase detector and hence the receiver; (*b*) a linear phase detector and main feedback loop having included therein a fast acquisition unit circuit, hereinafter more fully described, which derives a DC component from the phase detector of the correct sign for acquiring almost instantaneous lock of the system onto an incoming information signal, and (*c*) an assist loop having a filter amplifier to assist the main feedback loop in maintaining lock onto the incoming signal by passing a high frequency noise suppression output through a phase modulator to the system's phase detector for suppressing high frequency noise when the signal-to-noise ratio has been lowered to the point where the high frequency noise generated by the phase detector would, without such suppression, become dominant and cause the main feedback loop to track the noise and return incorrect information to the IF stage of the receiver.

BRIEF DESCRIPTION OF THE DRAWINGS

A general description followed by a detailed description of a preferred embodiment of this invention follows with reference being made to the drawings wherein like parts have been given like reference numerals for clarity and understanding of the elements and features of the invention.

Figure 1:
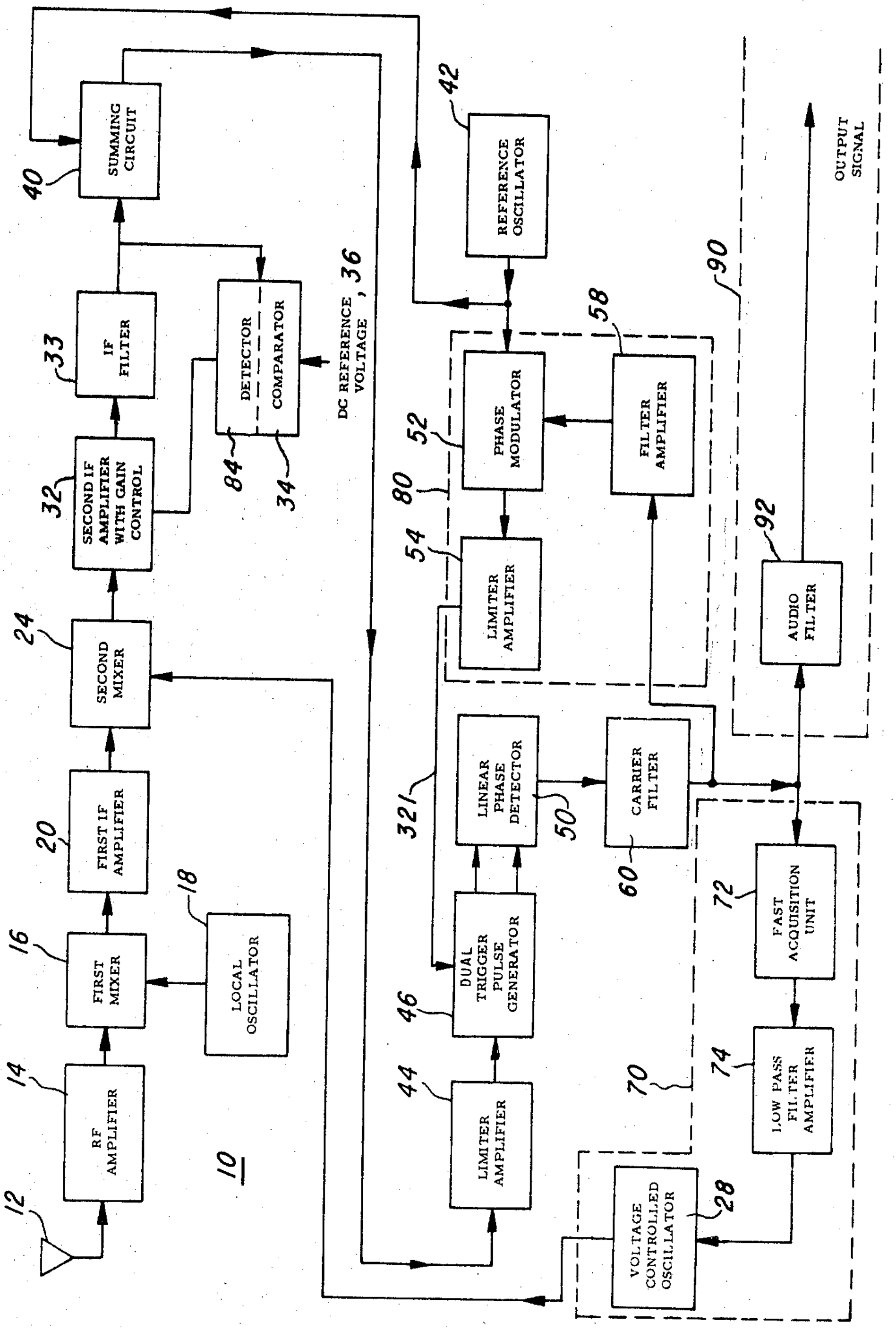
FIG. 1 is a block diagram illustrating the general form of a system incorporating the invention.

The general form of the preferred embodiment of this invention is incorporated into a frequency modulated system 10 which as shown in FIG. 1 includes-after a conventional low noise radio frequency amplifier 14, mixer 16 and first IF stage 20—a second mixer 24 to which is coupled the received signal as one input and the correct signal acquisition output of a voltage controlled oscillator 28 of the main feedback loop 70 as a second input. An IF filter 33 and a second IF amplifier 32 with gain control are coupled in series with the output of the second mixer. The output of the second IF amplifier with gain control is kept constant by using a detector 84 and comparator 34 which sample the average IF voltage with a DC reference voltage 36 and adjusts the second IF amplifier output as necessary to keep the voltage output constant. The constant amplifier voltage output of the second IF amplifier 32 is applied through the IF filter 33 as one input to a summing circuit 40 and the output of a reference oscillator 42, which is equal in magnitude to that of the second IF amplifier and co-phasal with its carrier component, is applied as a second input. The voltage of the second IF amplifier output is made equal to the output of the reference oscillator 42 by adjusting the DC reference voltage 36 applied to the detector 84 and comparator 34. By using these combinations of signals, the sensitivity of the FM receiver 10 is improved and the threshold voltage is reduced. Further, the click noise associated with a FM discriminator due to the $2\pi$ cyclic nature of the phase noise, and with envelope minima of the received signal and noise is suppressed, and the detector's range of linearity is increased. Equally important is the fact that the modulation phase angle of a composite signal at the output of the summing circuit 40 is exactly one-half of the modulation phase angle of the signal considered alone at the output of the summing circuit. The output of the summing circuit is applied to the input of a limiter 44 which is a conventional limiter that converts the input sinusoidal type FM modulated signal from the summing circuit 40 to square waves. The square wave output of the limiter 44 is applied to one side of a dual trigger pulse generator 46 which generates negative pulses at the transistions of the limiter signal; these negative pulses are applied as one input to a conventional bistable switching circuit that functions as a linear phase detector 50. The square wave output of a second phase modulator limiter 54 is applied to the other side of the dual trigger pulse generator 46 and the resulting negative pulses are applied as a second input to the linear phase detector 50. The second phase modulator limiter 54 derives its input from a phase modulator 52 which modulates the phase of the reference oscillator output with the high frequency (noise) output of a filter amplifier 58 receiving a part of the output from the linear phase detector's carrier filter 60. The output of the linear phase detector 50, which represents the phase difference between the composite signal at the output of the summing circuit 40 and the signal at the output of the phase modulator 52, is passed to the carrier filter 60.

The carrier filter 60 is a relatively broadband low-pass filter which also includes frequency traps at the IF carrier frequency and its harmonics. The carrier filter passes the DC frequency drift components, modulation components, and noise detected by the phase detector while attenuating the carrier components and harmonics thereof.

The carrier filter output forms the inputs for a main feedback loop 70, an assist loop 80 for the main feedback loop and an audio circuit 90. The input to the audio circuit 90 is to an audio filter 92 which is designed to pass all signal waves in the audio band, but to reject noise components outside of this band. The audio filter 92 may also be used to equalize the audio signal output spectrum if desired. The output from the audio filter is the desired output which is passed on to the audio stage of the receiver. The input to the feedback assist loop 80 is used to greatly enhance the action of the main feedback loop 70. It has been found that as the carrier-to-noise ratio is lowered, the main feedback loop 70 through the variable controlled oscillator 28 ceases to be able to provide the correct feedback action and a threshold effect occurs; i.e., the peak value of the carrier is only slightly greater than that of the noise. Thus, the main feedback loop 70 requires an sssist which is furnished by the assist loop 80 which includes a filter amplifier 58 whose input is the output of the carrier filter 60 and whose output is an input to the phase modulator 52. The filter amplifier 58 is a broadband low frequency filter and amplifier which provides very little amplification or even attenuation of the signal frequency modulation but does provide amplification of the noise occurring above the modulation band. The phase mosulator modulates the high frequency output of the filter amplifier 58 with the reference oscillator output, and the modulated signal is applied to the dual detector pulse generator circuit which produces the pulse inputs for the phasedetector 50. The assist loop 80 thereby provides high frequency feedback at the phase detector and suppresses a further threshold effect associated with excess noise detected by the phase detector at very low signal-to-noise ratios which otherwise would occur in the main feedback loop. The carrier filter input to the main feedback loop 70 is to a series circuit including a fast acquisition unit 72, a low-pass filter amplifier 74 coupled to the output of the fast acquisition unit 72 and the voltage controlled oscillator 28. Thefunction of the fast acquisition unit 72 is to provide correct acquisition information to the main feedback loop when the loop is out of lock for rapid acquisition of received signals even though there is considerable initial mistuning and even in the presence of modulation.

Referring now to FIG. 1 for the detailed description of the preferred embodiment which comprises an FM receiver 10. In the receiver an antenna 12 receives a FM modulated signal and feeds it to an RF amplifier 14 for amplification and then to a mixer 16 for conversion of the carrier frequency to an intermediate frequency. The incoming signal from the antenna varies the mixer bias and the mixer output varies in accordance with the signal. A local oscillator 18 provides a second voltage output which also varies the mixer bias. With two different frequencies simultaneously varying the mixer bias the output intermediate frequency (the difference frequency) only is passed on to the first IF amplifier 20. The IF amplifier 20 amplifies only the intermediate frequency and the modulation side-bands and passes them as a FM signal having the same modulation index as that received by IF amplifier 20 to a second mixer 24. The modulation index is the ratio of the division (or shift) of the FM signal in kilocycles to the frequency of the modulating signal also in kilocycles. The circuit and its components to this point are those of a regular superheterodyne FM receiver in which amplification and filtering are achieved without limiting.

THE SECOND MIXER

The intermediate frequency signal with its side-bands comprises one input to bias a second mixer 24 (FIG. 1). A voltage controlled oscillator (VCO) 28 provides a second input to the mixer 24 whose modulation index is a fraction smaller than that of the IF frequency. The center frequency of the VCO is offset downwardly from the intermediate frequency of the IF amplifier IFamplifier 20 to a second IF frequency, and the VCO as the last component of a main feedback loop 70, hereinafter described, receives carrier frequency changes which makes its output or instantaneous oscillator frequency follow the IF modulation frequencies as well as any carrier drift. With two different frequencies simultaneously varying the mixer bias the output is a further down conversion of the IF signal to a second IF frequency and a compression of the modulation index of the signal at the output of said mixer.

The second mixer 24 (FIG. 2A) may be, for example, a diode bridge balanced mixer which as mentioned above receives: firstly, the output of the voltage controlled oscillator 28 through a circuit including VCO output terminal 21, an attenuator network including resistor 23, having one terminal connected to ground through resistor 25 and the opposite terminal connected to ground through resistor 29, and the primary winding of a first transformer 27 of the second mixer 24 to ground; and secondly the output of the first IF amplifier 20 through a series circuit including IF terminal 31, (FIG. 2A) base of emitter follower transistor 35 also connected to base biasing resistor 22 to ground, emitter of transistor 35 connected to emitter resistor 41 coupled to negative power supply terminal 43, and to capacitor 48, resistor 45 and primary winding of a second transformer 47 of the second mixer 24 to ground. The collector of the transistor 35 is connected directly to positive power supply terminal 39. The secondary winding of the first transformer 27 is center tapped by conductor 49 to ground to divide the voltage controlled oscillator output equally but out of phase to the diode bridge 51; the secondary of transformer 47 is center tapped by conductor 53 to divide the output of the IF amplifier 20 equally but out of phase also to the diode bridge 51 and to conduct the bridge output carrier and upper and lower sideband frequencies to suppression filter 30 hereinafter described. The IF signal is recovered by subtracting the outputs of the diodes. Any VCO noise appearing at the diodes will be in phase and will be canceled upon subtraction.

SUPPRESSION FILTER, IF AMPLIFIER WITH GAIN CONTROL AND FILTER

The compressed output of the second mixer is passed to the carrier and upper sideband suppression filter 30 (FIG. 2A) which is a low-pass filter having a bandwidth sufficient only to pass the lower sideband output of the second mixer 24. This signal is then amplified by the gain controlled IF amplifier 32 whose output is inductively coupled to an IF filter 33 which is a narrow band single tuned IF filter having a bandwidth sufficient only for the small index compressed frequency modulated signal from IF amplifier 32.

The carrier and upper sideband suppression filter 30 (FIG. 2A) includes an inductor 55, having one side coupled to ground through capacitor 57 and resistor 59 and the other side coupled to ground through resistor 63. The small index frequency modulated signal of the carrier and upper sideband suppresssion filter 30 forms the first input through a coupling capacitor 61 to a positive terminal of a second conventional type IF amplifier 32 with voltage gain control. The second IF amplifier 32 (FIG. 2A) may be, for example, Motorola's MC 1590G described in The Microelectronics Data Book, Motorola Semiconductor Products Inc., 2nd Edition, 1969. It is necessary to keep the average IF output voltage of the second IF amplifier 32 constant and independent of variations in the level of the received signal and noise. Thus, a voltage detector 84 and comparator 34 (FIG. 2A) is provided for gain control. The detector 84 detects the IF voltage at the output of the IF filter 33 after it passes through an impedance matching network including a transistor 139. The comparator compares this average voltage with a DC reference voltage obtained from a source 36. The value of the DC reference voltage is determined from a summing circuit 40 hereinafter described, and provides an adjustment signal on lead 64 as the second input to the second IF amplifier 32.

The adjustment signal on lead 64 is a voltage gain control feedback from the output of the IF filter impedance matching transistor 139 through a circuit including conductor 65, transistor coupling capacitor 67, resistor 69, and base of amplifier transistor 71 also connected to ground through a bias stabilizing resistor 73. The collector of the transistor 71 is connected through resistor 81 to the positive source of power 83, and through capacitor 79 to detector 84. A feedback circuit including a capacitor 77 and a resistor 75 is provided across the collector-base junction of transistor 71. The emitter of the amplifier transistor 71 is connected to the negative power supply terminal 43 through bias resistor 111 having a bypass capacitor 113 to ground. The detector 84 includes diodes 85 and 87 connected in opposite polarities to one side of capacitor 79 and to ground through, respectively, resistors 89 and 93. The output of detector 84 is coupled through resistor 91 to the positive input terminal of a DC comparator amplifier 95 which is also connected to a bypass capacitor 97 to ground. The output of the DC comparator amplifier 95 is connected to resistor 99 and from resistor 99 to the second positive terminal of the second IF amplifier 32 by lead 64. A part of the output of the DC comparator amplifier 95 is fed back 103, potentiometer 101 to the negative terminal of the DC amplifier 95. The negative terminal of the DC comparator amplifier 95 is also connected to the DC reference source 36 through a circuit which includes a resistor 103,potentiometer arm 105, potentiometer resistor 107 having one end grounded and the other end connected through resistor 109 to the positive power supply terminal 83. The DC amplifier 95 may be, for example, a Texas Instruments SN 52709 high-performance operational amplifier described in James N. Giles, Fairchild Semiconductor Linear Integrated Circuits Applications Handbook Ch. 6, Lib. of Congress Catalog No. 67–27446, which has an input stage, a second stage, and an output stage (not shown). Power is supplied the DC amplifier 95 by conductor 115 connected to the positive power supply 83 and conductor 117 connected to the negative power supply 43. To insure stable operation of the DC amplifier 95 under feedback conditions external frequency compensation networks are provided which include first a collector-to-base feedback network around the second stage of the amplifier via the RC circuit 119 for a roll off of 6 db per octave, and secondly a capacitor feedback circuit 121 coupled across the output stage of the DC amplifier 95 for further roll-off at higher frequencies.

Returning to the IF amplifier 32, the IF amplifier 32 is shielded by grounding the case through conductor 123 and the substrate of the amplifier through conductor 125. Power is supplied the IF amplifier 32 through conductor 126 connected to positive power supply terminal 39. The constant voltage output of the IF amplifier 32 is across the primary winding 127 of a step-up transformer coupled to the positive power supply terminal 39 through resistor 129 and to ground through a high frequency bypass capacitor 131. The secondary winding 133 of the transformer is tuned by a variable capacitor 135 and the tuned frequency is passed to a capacitor 137 of an impedance matching network. The output of the capacitor 137 is connected to a capacitor 141 to ground, a resistor 143 to ground, an emitter feedback capacitor 145 which is coupled to capacitor 147 to ground and base of an emitter follower Q multiplier transistor 139. The emitter of the Q multiplier transistor 139 is in series with a load resistor 149 and negative terminal 43; the collector of the Q multiplier transistor 139 is connected to positive power supply terminal 39. The output of the Q multiplier transistor 139 is to the detector-comparator conductor 65 and to a coupling capacitor 151 for capacitance coupling the output of the second IF amplifier 32 to the summing circuit 40.

SUMMING CIRCUIT

The summing circuit 40 (FIG. 1) is used to sum the constant average voltage output of the IF amplifier with the noise free output of a reference oscillator 42. The summing circuit 40 is an active network whose output is proportional to the sum of the two input voltages. The amplitude of the voltage output of the IF filter 33 as measured at the output of the summing circuit 40, is made equal to the amplitude of the voltage of the reference oscillator 42 as measured separately at the output of the summing circuit 40 by adjusting the DC reference voltage 36. The IF signal at the output of the summing circuit 40 may be expressed mathematically as $A\ \mathrm{Cos}[W_o t + \theta(t)]$ where A is the peak amplitude of said signal, $W_o$ is the radian frequency of said signal, and $\theta(t)$ is the compressed frequency or phase modulation of said signal. When the signal of the second IF amplifier 32 is so expressed then the reference oscillator signal at the output of the summing circuit 40 can be written as $A\ \mathrm{Cos}\ W_o t$ where A and $W_o$ remain as previously defined. This phase coherence is required for satisfactory combination of the two signals in this summing circuit. Thus, with the summing circuit inputs adjusted as described, the summing circuit output is $2A\ \mathrm{Cos}[\theta(t)/2]\ \mathrm{Cos}[W_o t + \theta(t)/2]$. As the frequency modulation index of the wave at the second IF amplifier 32 is reduced, the value of the frequency or phase modulation $\theta(t)$ will be sufficiently small that $\mathrm{Cos}\ \theta(t)/2$ will be approximately one and the composite signal at the output of the summing circuit 40 can be approximated by $2A\ \mathrm{Cos}[W_o t + \theta(t)/2]$ which is twice the amplitude of the IF signal alone at this point. Due to this effect, the amplitude signal-to-noise ratio at this point has been artifically increased by a factor of four with a subsequent improvement in sensitivity, of the following phase detector. The signal-to-noise ratio of the signal derived from the phase detector thus does not catastrophically degrade (reach threshold) until a lower input signal-to-noise ratio than would be the case if the reference signal were not added. A receiver's sensitivity is a measure of its ability to reproduce a weak signal and is defined as the minimum strength of input signal required in order to reproduce a desired level of signal output.

It has also been found that this combining of signals by the summing circuit 40 is the only combination that produces a composite signal having a phase angle that is linearly related to the phase angle of the IF signal considered alone at the output of the summing circuit 40. Thus, the modulation phase angle of the composite signal at the output of the summing circuit 40 is exactly one half of the modulation phase angle of the signal considered alone at the output of the summing circuit.

Figure 2A:
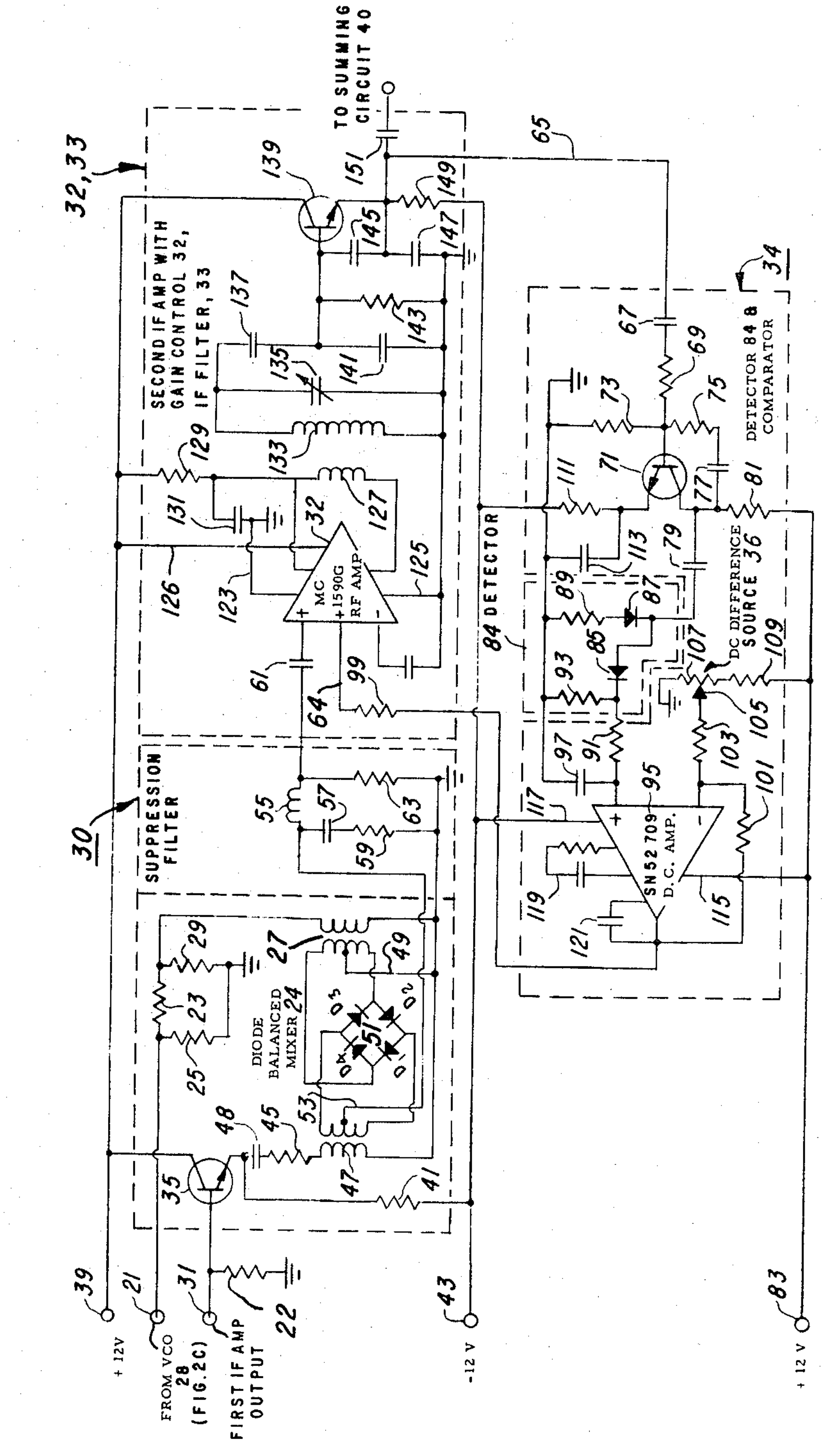
FIGS. 2A–D constitute a circuit diagram of a system incorporating the invention.
Figure 2B:
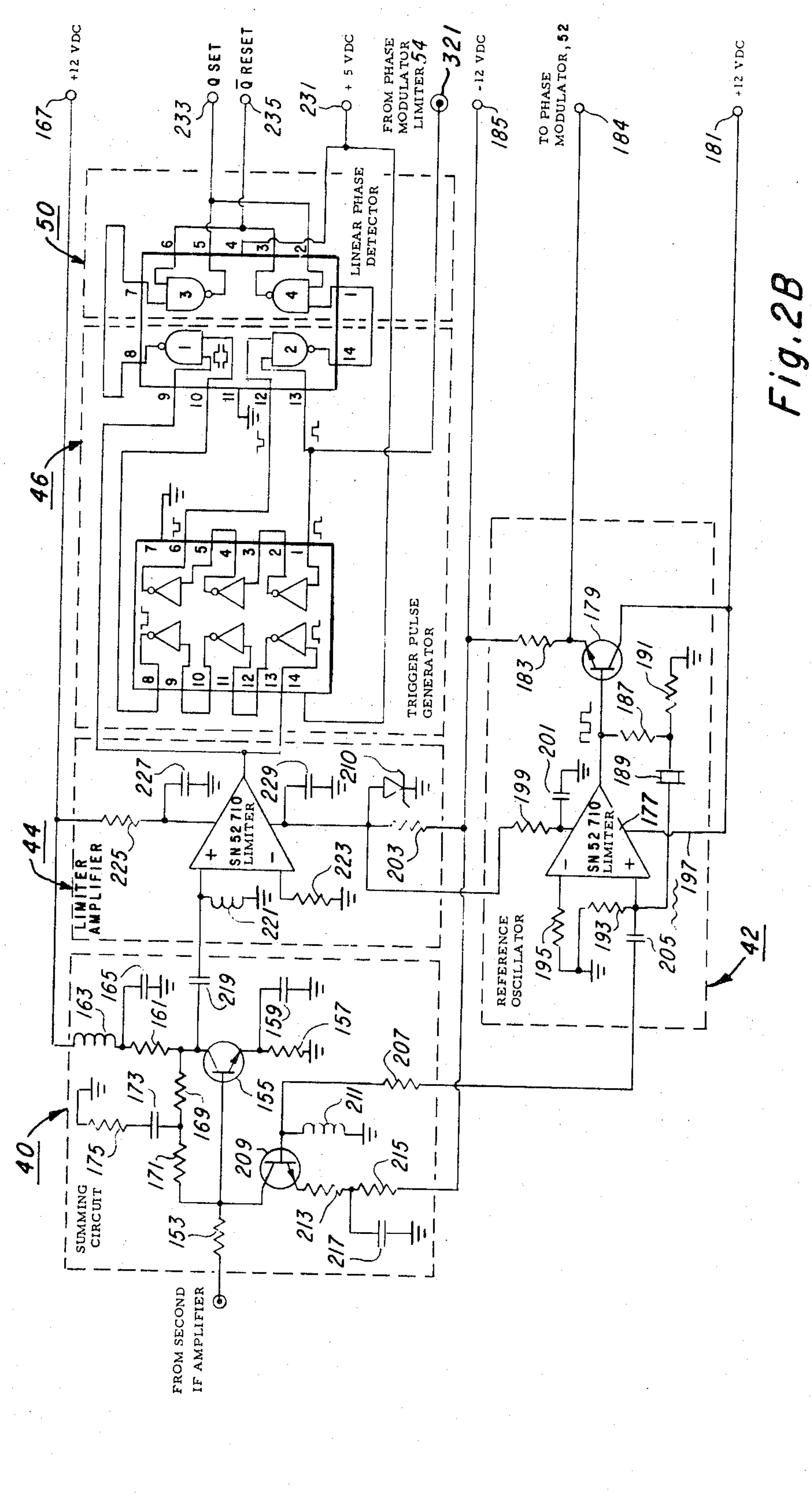

The summing circuit 40 may have many forms, but as shown in FIGS. 2A and 2B it receives the output of the second IF amplifier as one input through the coupling capacitor 151, resistor 153, and base of a transistor 155. A second input from a reference oscillator 42, hereinafter described, is connected to the transistor 155 between its base and transistor 153. The emitter of the transistor 155 is coupled to ground through resistor 157 and is also coupled to a bypass capacitor 159 to ground. The collector of the transistor 155 is connected in series to a load resistor 161 and to an inductor 163. The common terminal between resistor 161 and inductor 163 is coupled to capacitor 165 which is connected to ground. The positive power supply at terminal 167 is coupled to the other side of inductor 163. A shunt feedback circuit is provided across the collector-base junction. The shunt feedback circuit includes resistor 169 connected to resistor 171; a capacitor 173 in series with resistor 175 to ground is connected to the junction of the resistor 171 and 169.

The second input to the summing circuit is from the ference oscillator 42 which also provides an input to a phase modulator 52 via conductor terminal 184. The reference oscillator circuit includes a crystal oscillator which consists of a limiter amplifier 177 which, for example may be a Texas Instruments designated SN 52710 differential comparator, described in James N. Giles, Fairchild Semiconductor Linear Integrate circuits Applications Handbook, Chapter 7, Lib. of Congress Catalog No. 67–27446. The reference oscillator circuit to the phase modulator includes the output of the limiter amplifier 177, junction of a crystal feedback circuit, hereinafter described, and base of emitter follower transistor 179. The emitter of transistor 179 is connected through an emitter load resistor 183 to the negative power terminal 185 and to the input terminal 184 for the phase modulator 52 hereinafter described. The collector of transistor 179 is connected directly to positive power supply terminal 181. The crystal feedback circuit, taken from the output of the limiter amplifier 177, includer a resistor 187, and a piezoelectric crystal 189 having a natural frequency equal to the second IF and the positive terminal of the limiter amplifier 177. A grounded resistor 191 is coupled between resistor 187 and piezoelectric crystal 189. The positive terminal of the limiter amplifier 177 is also coupled to a bias resistor 193 to ground. The negative terminal of the limiter amplifier 177 is connected through resistor 195 to ground. Operating power is supplied the limiter amplifier 177 through conductor 197 connected to the positive power supply terminal 181, and through resistor 199 connected to resistor 203 which is coupled to the negative power terminal 185. A standard biasing zener diode 210 is coupled between resistors 199 and 203 to ground and a grounded AC bypass capacitor 201 is connected between the resistor 199 and the limiter amplifier 177. The reference oscillator circuit to the summing circuit is from the positive terminal of the limiter amplifier 177, coupling capacitor 205, resistor 207, to the base of buffering transistor 209. The base of the buffering transistor 209 is also connected to an inductor 211 to ground. The collector of buffering transistor 209 is connected to the base of the summing circuit transistor 155, and the emitter of buffering transistor 209 is connected to emitter resistor 213 coupled to the negative DC power terminal 185 through resistor 215, and to a grounded high frequency bypass capacitor 217. The combined output of the summing circuit transistor 155 is taken across the collector load resistor 161 through coupling capacitor 219 to the positive terminal of the limiter amplifier 44 which is also coupled to an inductor 221 to ground.

LIMITER AMPLIFIER

The output of the summing circuit, which is a composite signal having a phase angle exactly equal to one half of the modulation phase angle and a sinusoidal waveform, is applied to the limiter amplifier 44 which converts the sinusoidal waves of the FM modulated signal to square waves with an instantaneous frequency and phase angle equal to that of the input sinusoidal waves. The limiter amplifier 44, FIG. 2B, receives the output of the summing circuit 40 at its positive terminal. The negative terminal is connected through resistor 223 to ground. Operating power is supplied to limiter amplifier 44 through a resistor 225 having one end connected to the positive power supply terminal 167 and its other end connected to a grounded high frequency bypass capacitor 227; and through the standard negative bias provided by the resistor 203 having one end connected to the grounded zener diode 211 and its other end connected to the negative power supply terminal 185. A grounded high frequency bypass capacitor 229 is connected between the resistor 203 and the limiter amplifier 44. The limiting amplifier's output is applied as a first input to a dual trigger pulse generator 46 (FIG. 1).

DUAL TRIGGER PULSE GENERATOR

The dual trigger pulse generator 46 may be, for example, a hex inverter designated by Texas Instruments as a SN 7404 and NAND gates 1 and 2 of a quadruple two input positive NAND gates designated by Texas Instruments as the SN 7400. The SN 7404 and SN 7400 are described in TTL Integrated Circuits Catalog from Texas Instruments, Texas Instruments Incorporated, 1 Aug. 1969, pp 2–11 and 2–5. The square wave output of the limiter amplifier 44 is the input at terminal 13 to three series connected inverters of the dual trigger pulse generator 46 (FIG. 2B) and the delayed inverted square waves constituting the inverter output are taken from output terminal 8 to input terminal 10 of said first NAND gate. The square wave output of the limiter amplifier 44 is also the second input (terminal 9) to the said first NAND gate and the output from terminal 8 is the trigger pulse source which forms one input to the linear phase detector 50. The dual trigger pulse generator 46 receives also the square wave output of phase modulator limiter 54 via conductor terminal 321. The exact nature of the square wave output and its formation will be described in the description of the assist loop for the main feedback loop. The square wave output of the phase modulator limiter 54 is the input at terminal 1 to three other series connected inverters of the dual trigger pulse generator 46, and the delayed inverted square waves of the inverters are taken from terminal 6 to input terminal 12 of said second NAND gate; the square wave output of the phase modulator limiter 54 is also the second input, a terminal 13, to the said second NAND gate and the output from this gate from terminal 14 is the trigger pulse source which forms the second input to the linear phase detector 50. Terminals 14 and 7 of the SN 7404 and terminals 4 and 11 of the SN 7400 are connected to the positive power supply 231 and ground respectively.

The square wave output of limiter amplifier 44 is converted to trigger pulses as follows: The square wave input of limiter amplifier 44 is fed through one set of the inverters of the hex inverter which delays as well as inverts the square wave output; this output is a logic state 1 input to the first NAND gate. The square wave input of the limiter amplifier 44 is also fed directly as a state 0 input to the first NAND gate. The truth table for a NAND gate is now applied and a pulse having a width equal to the delay time of the set of inverters appears at each positive transaction of the square wave input or stated differently at $2\pi$ radian intervals.

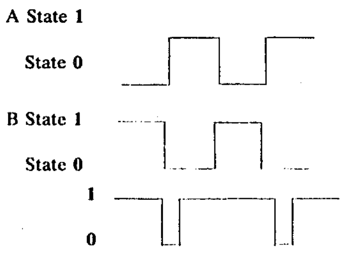

Truth Table NAND Gate

| A | B | L |
|---|---|---|
| 0 | 0 | 1 |
| 0 | 1 | 1 |
| 1 | 0 | 1 |
| 1 | 1 | 0 |

The square wave output of the phase modulator limiter amplifier 54 is converted to trigger pulses in the same manner by the second NAND gate and therefor need not be described again.

Linear Phase Detector

As shown in FIG. 2B, the linear phase detector 50 consists of NAND gates 3 and 4 of the SN 7400 connected as follows: The IF pulse output (terminal 8) of the first NAND gate is connected to input terminal 7 of the third NAND gate, and the reference oscillator pulse output (terminal 14) of the second NAND gate is connected to input terminal 1 of the fourth NAND gate. Output terminal 5 of the third NAND gate is connected to terminal 233 (Q) and to an input terminal 2 of the fourth NAND gate. Output terminal 3 of the fourth NAND gate is connected to terminal 235 ($\bar{Q}$) and to the output terminal 6 of the third NAND gate. In this configuration a "flip-flop" circuit is formed whose output measures the difference in phase angle error at the Q and $\bar{Q}$ terminals.

The IF frequency pulses and reference oscillator frequency pulses generated by the first and second NAND gates of the dual trigger pulse generator 46 are fed into gates 3 and 4 of the phase detector 50 as logic state 1 inputs; logic state 1 appears as the output at Q or terminal 233 and logic state "0" appears at $\bar{Q}$ or terminal 235 until the first logic state "0" appears as an input at either gate to change the output at Q (terminal 233) to logic state 0 and $\bar{Q}$ (terminal 235) to logic state 1. These logic states are retained until the next logic state 0 appears at the other gate at which time their respective stages revert to their original settings. The width of the zero state wave represents the phase difference $\phi$ between the IF signal and the reference signal. The signals thus generated are hereinafter referred to collectively as a modulated square wave pulse-space train.

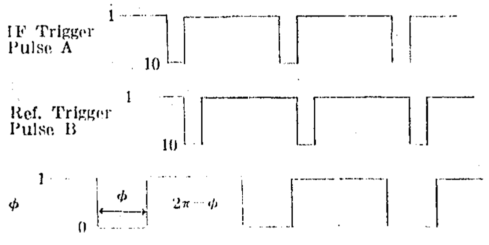

Figure 3:
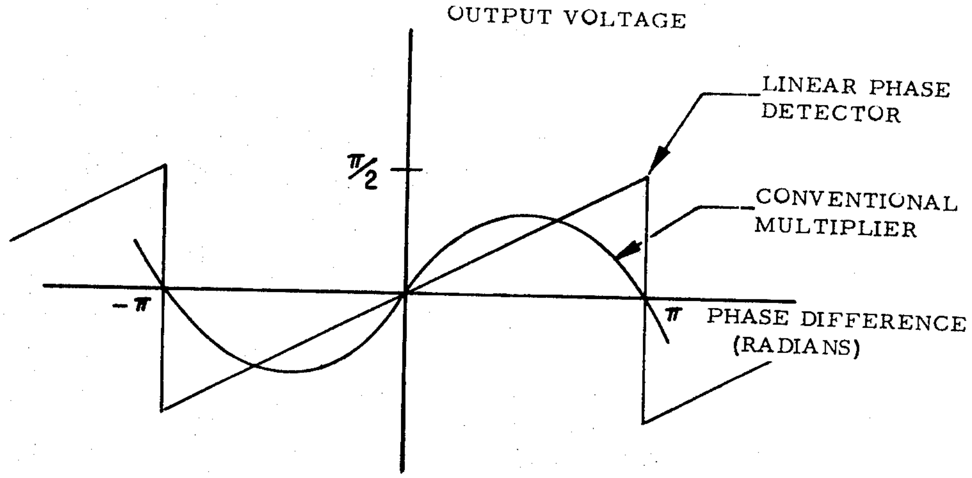
FIG. 3 is a graph comparing the performance of the sawtooth phase comparator of the embodiment of this invention to that of the conventional sine producing phase comparator.

The performance of the digital type linear phase detector used in this circuit is compared with the sinusoidal feedback function in FIG. 3.

CARRIER FILTER

The modulated square wave pulse space train of signals from the linear phase detector 50 is coupled to a carrier filter 60, (FIG. 2C) which may also include frequency traps at the second IF frequency and its harmonics and which passes the DC component, modulation components and noise detected by the linear phase detector 50, but which attenuates the carrier components and the harmonics thereof.

Figure 2C:
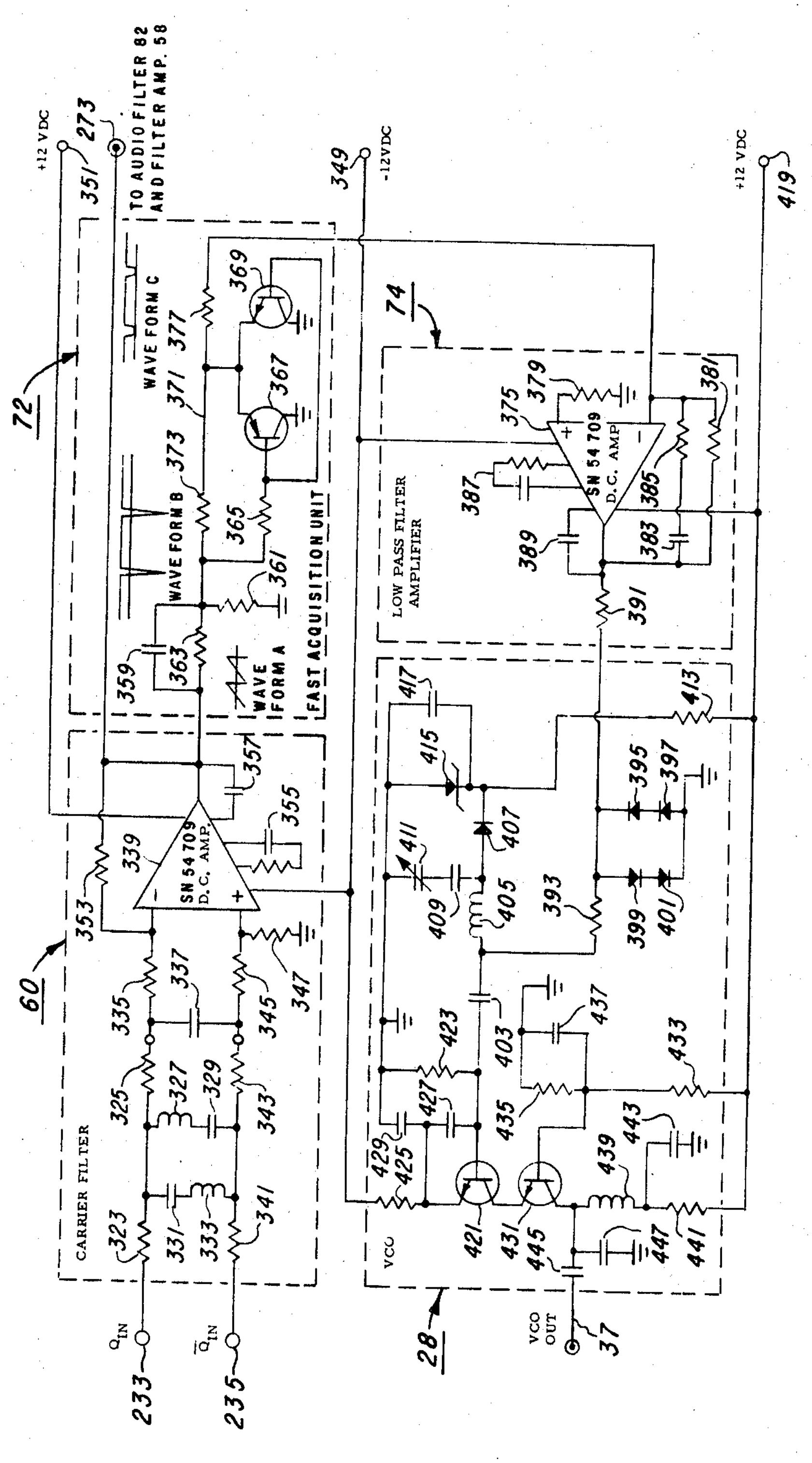

The (Q) and ($\bar{Q}$) output signals of the phase detector 50 are the inputs to the carrier filter 60 (FIG. 2C). The (Q) input is through filter resistor 323, resistor 325, and load resistor 335 to the negative terminal of a DC amplifier 339. The ($\bar{Q}$) input is through resistor 341, resistor 343, and load resistor 345 to the positive terminal of the DC amplifier 339. A first frequency trap is formed by a capacitor 331 having one end connected to the output end of resistor 323 and its other end connected to one end of an inductor 333 having its other end connected to output end of resistor 341. A second frequency trap is provided by an inductor 327 having one end connected to the input side of resistor 325 and its other end coupled to one end of capacitor 329 with its other end coupled to the input side of resistor 343. The positive terminal of the DC amplifier 339 is also connected to a grounded resistor 347. The DC amplifier 339 may be, for example, another Texas Instruments designated SN 54709 DC amplifier which is connected directly to the negative power supply terminal 349 and to the positive power supply terminal 351. The DC amplifier 339 has an external feedback loop which includes a feedback resistor 353 having its ends coupled respectively to the negative and positive terminals of the amplifier 339. Since feedback is involved with the DC amplifier 339, external compensation is required as mentioned in connection with the prior description of this type amplifier to stabilize the amplifier; therefore, the first compensation point is a collector-to-base feedback around the second stage (not shown) of the amplifier via the R-C circuit 355 which provides the first 6 dB per octive roll-off, and the second compensation point is the capacitor feedback loop 357 around the output stage (not shown).

The output of the carrier filter 60 is used as the input to three separate circuits—a main feedback circuit 70, as assist loop circuit 80 and an audio circuit 90 (FIG. 1). The output for the assist loop circuit and the audio circuit is connected to terminal 273 (FIG. 2C).

MAIN FEEDBACK LOOP

The main feedback loop circuit 70 (FIG. 1) is to return a part of the output of the carrier filter 60 to the second mixer 24 and includes a fast acquisition unit 72 for obtaining instant lock information, a low pass filter and amplifier 74 for obtaining and amplifying the desired modulation frequency and any carrier drift information, and the VCO 28. When the system is out of lock a sawtooth wave form A, FIG. 2C, is produced as the difference frequency output of the carrier filter 60. The sawtooth wave is a periodic wave whose amplitude varies linearly with time between two halves the interval required for one direction of progress being longer than that for the other. This sawtooth wave forms the input to the fast acquisition unit 72 which includes a differentiating circuit (FIG. 2C) having a capacitor 359 connected to a resistor 361 to ground. A resistor 363 is coupled across the capacitor 359 to permit a low frequency or DC current to bypass the capacitor 359. When the input voltage of the sawtooth wave increases at a constant rate corresponding to the IF carrier frequency being above the frequency of the reference oscillator the current into the resistor 361 is maintained at a steady value which results in a constant voltage drop across the resistor 361. When the decrease in voltage occurs at a more rapid rate the current is greater in amplitude; therefore, a greater voltage drop is produced at the output which is at the common junction of resistor 361 and the resistor 363. Thus, the waveform of the output of the differentiator is as shown at waveform B (FIG. 2C). To reestablish the DC level of the waveform a clamping circuit is provided for the differentiator output. The clamping circuit introduces a reference level at the negative or positive peaks, depending on whether the second IF frequency is above or below the reference frequency which as shown in waveform B are negative peaks. The clamping circuit eliminates the negative or positive peaks and the output waveform is as shown at waveform C. The waveform now has a DC componene of the correct sign to cause the loop to acquire lock. The clamping circuit (FIG. 2C) comprises a resistor 365 and the base of a PNP transistor 367 and the base of a NPN transistor 369. The transistors 367 and 369 are connected in an inverted arrangement, that is, the collectors are connected to ground. Thus, the emitter potentials are equal to the collector potentials when conducting and provide the positive and negative clamping potentials to the output conductor 371 which is common to resistors 373 and 377. The peak voltage input (waveform B) causes the appropriate transistor 367 or 369 to conduct to limit the input voltage and generate the voltage output at waveform C. When the system is in lock, the fast acquisition unit 72 provides a desirable compensating frequency filter function in the main feedback loop. The output of the fast acquisition unit 72 inputs to low-pass filter unit 74 and more particularly is the input to the negative terminal of a low pass filter amplifier 375 which amplifier and passes frequency modulation and any carrier drift component detected by the phase detector 50 or fast acquisition unit 72 to the VCO 28.

The low-pass filter amplifier 375 may be, for example, another SN 54709 DC amplifier with a feedback loop including a low-pass filter. The feedback loop low-pass filter is from the output of the DC amplifier 375 through resistor 381 to the negative terminal of the DC amplifier, with a capacitor 383 in series with a resistor 385 coupled across the resistor 381. The positive terminal of the DC amplifier is connected through resistor 379 to ground. To stabilize the amplifier, external compensation is added through the external R-C feedback circuit 387 coupled across the collector-to-base of the amplifier's second stage (not shown) and the capacitor 389 feedback circuit across the output stage.

The output of the low-pass filter amplifier 74 is connected to the voltage controlled oscillator 28 by a series circuit including a resistor 391 and a resistor 393 having therebetween a voltage limiting network which includes a pair of diodes 395 and 397 connected in series to resistor 393 and to ground and a second pair of diodes 399 and 401 connected in series across the same points to ground but with reversed polarities. From the resistor 393 the circuit includes a capacitor 403 coupled to a tuned circuit including an inductor 405 in series with varactor 407; a capacitor 409 in series with a grounded variable capacitor 411 is connected to the junction of the inductor 405 and varactor 407. The varactor 407 is coupled through resistor 413 to the positive power supply terminal 419. A bias stabilizing zener diode 415 to ground and a bypass capacitor 417 to ground is connected between the resistor 413 and varactor 417. From the capacitor 403 the circuit includes the base of the voltage controlled oscillator transistor 421 which is also coupled to a base biasing resistor 423 to ground. The emitter of transistor 421 is connected through emitter resistor 425 to the negative power supply terminal 349. Circuitry is provided across the base-emitter junction of transistor 421 which includes capacitor 427 and capacitor 429 to ground. The collector of transistor 421 is connected to the emitter of transistor 431. The base of transistor 431 is connected to the positive power supply terminal 419 through resistor 433 and to a resistor 435 to ground and to bypass capacitor 437 to ground. The collector of the transistor 431 is connected to a grounded tuning capacitor 447, and to an inductor 439 which is connected to a grounded bypass capacitor 443 and to a resistor 441 connected to positive power supply terminal 419. The output of transistor 31 is to capacitor 445 and to the VCO output conductor 37 to the second mixer 24.

ASSIST LOOP

Figure 4:
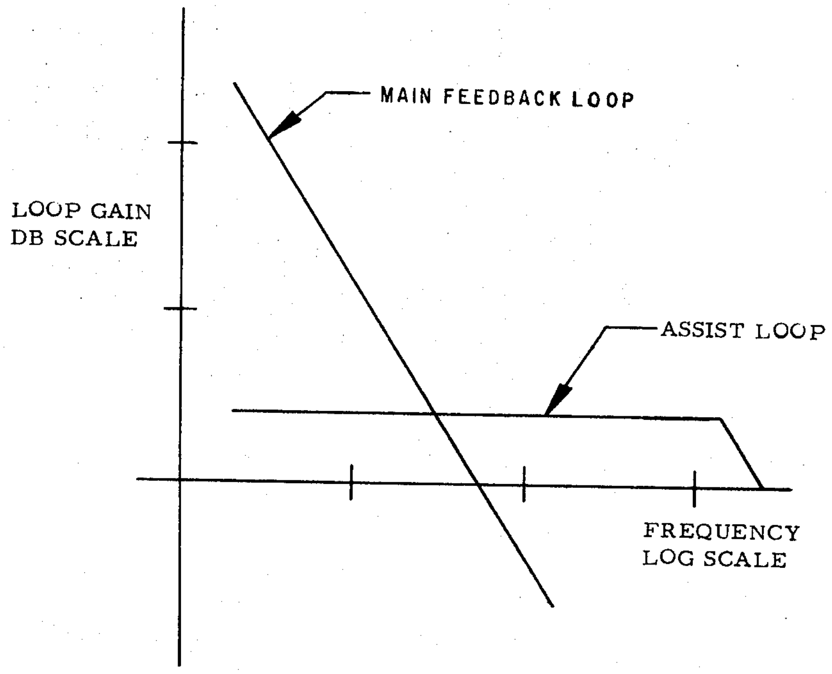
FIG. 4 is a graphical representation of the open loop frequency responses of the main feedback loop and the assist loop.

The assist loop circuit 80, (FIG. 1) which receives the second part of the carrier filter 60 output, includes the filter amplifier 58, the phase modulator 52 and the square wave producing limiter amplifier 54. The output of the assist loop is connected to the trigger pulse operation 46 through lead 321. The filter amplifier 58 which is a broadband low frequency filter provides very little amplification or attenuation of the signal frequency modulation but provides amplification of the noise occurring above the modulation band. Amplification of the noise is necessary because as the carrier-to-noise ratio is lowered, the main feedback loop 70 ceases to provide the correct feedback action and a threshold effect occurs because of additional high frequency noise generated by the linear phase detector 50. The output of the filter amplifier 58 is passed as the control input to the phase modulator 52 where it is combined with the output of the reference frequency oscillator 42 to provide high frequency correction at the phase detector 50, thus reducing the amount of high frequency noise fed back around the main feedback loop 70. The action of the assist loop on the main feedback loop response is shown in FIG. 4.

Figure 2D:
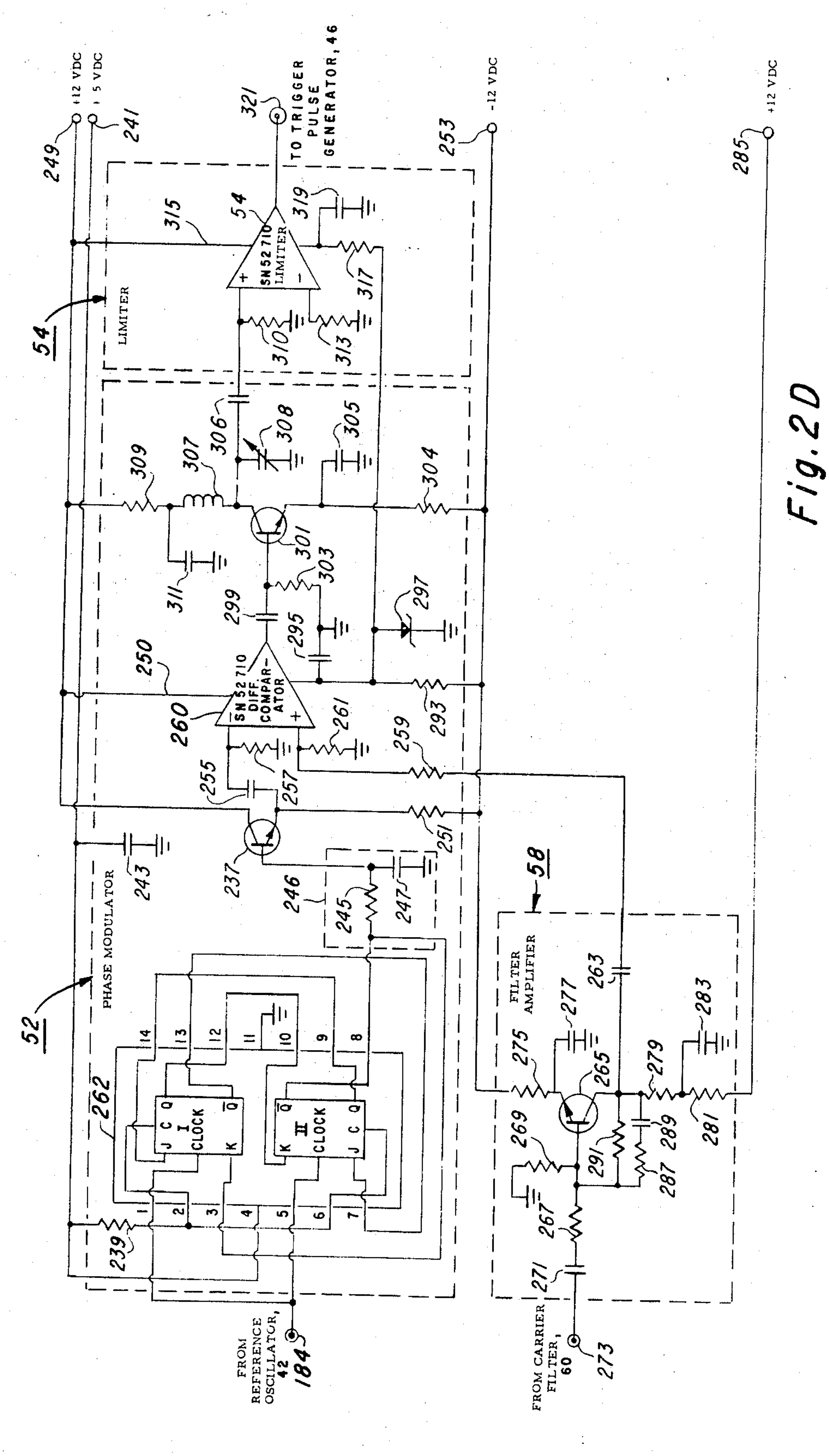

The filter amplifier 58 (FIG. 2D) receives at terminal 273 a part of the carrier filter 60 output. Terminal 273 is coupled in series with coupling capacitor 271, resistor 267, and base of transistor 265. The base of transistor 265 is also connected to a grounded resistor 269. A filter feedback circuit is provided across the base-collector junction of transistor 265 and includes a resistor 287 and capacitor 289 connected in parallel with a resistor 291. The collector of the transistor 265 is also coupled to a load resistor 279 which is connected to a grounded bypass capacitor 283 and to resistor 281 coupled to the positive power supply terminal 285. The emitter of transistor 265 is coupled to a grounded bypass capacitor 277 and to resistor 275 connected to the negative power supply terminal 253. The amplified high frequency output of transistor 265 is from the collector of transistor 265, to coupling capacitor 263, resistor 259, to the positive terminal of a differential comparator 260 of the phase modulator 52. The positive terminal of the differential comparator is also connected to a reference resistor 261 to ground.

The output from reference oscillator 42 is connected via terminal 184 to dual J-K master-slave flip-flops 262, with the output therefrom coupled to integrator 246. The integrator 246 is in turn coupled to transistor 237, the output of which is connected to the negative terminal of differential comparator 260 through coupling capacitor 255. The dual J-K master-slave flip-flops may be, for example, a Texas Instruments designated SN 7473 disclosed in TTL Integrated Circuit Catalog from Texas Instruments, Texas Instruments Incorporated, 1 Aug. 1969, p. 2–29, connected in a configuration referred to as a divide by 4 Johnson twisted ring counter. That is, the square wave output of the reference oscillator 42 is connected to the clock terminals 1 and 5 of the master and slave flip-flops I and II. The clear terminals 2 and 6 are biased off through a limiting resistor 239 to the positive DC power supply terminal 241 having a bypass capacitor 243 to ground to remove any AC from the DC source, and operating power is supplied through terminal 4 which is coupled directly to the positive supply terminal 241. The Q terminal 12 of master flip-flop I is connected to the K terminal 10 of slave flip-flop II, and the $\bar{Q}$ terminal 13 of the master flip-flop I is connected to the J terminal 7 of the slave circuit II. The J terminal 14 of the master circuit I is connected to the Q terminal 9 of the slave circuit II and the K terminal 3 of the master circuit I is connected to the $\bar{Q}$ output terminal 8 of the slave circuit II. The square wave frequency output $\bar{Q}$ of flip-flop II is equal to the square wave frequency input divided by four and has the following form:

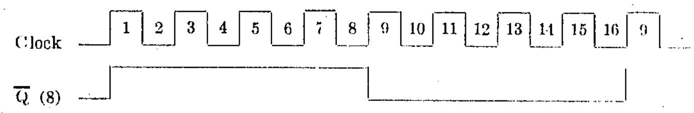

The long square wave output of the $\bar{Q}$ terminal 8 is applied to the integrator 246 which consists of the resistor 245 in series with capacitor 247 to ground with the output taken at the junction of the resistor 245 and the capacitor 247. The integrator changes the long square wave output $\bar{Q}$ to the following form:

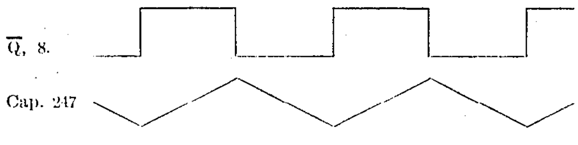

The integrator's output is connected to the base of buffering transistor 237 having its collector coupled directly to positive power supply 249 and its emitter coupled to the negative power supply terminal 253 through load resistor 251. The output of the transistor 237 is taken from the emitter which is coupled in series with a coupling capacitor 255 and the negative terminal of the differential comparator 260 which is coupled to a reference resistor 257 to ground.

The differential comparator 260 may be, for example, another Texas Instruments designated SN 52710. It receives operating power through conductor 250 coupled directly to the positive power supply terminal 249, and through resistor 293 having one end coupled to a standard biasing zener diode 297 to ground and another end connected to the negative power supply terminal 253. A bypass capacitor 295 is coupled to ground between the differential comparator 260 and resistor 293. The output of the differential comparator 260 is the high frequency control and if the reference resistor 261 is set for zero the form of the output is as follows:

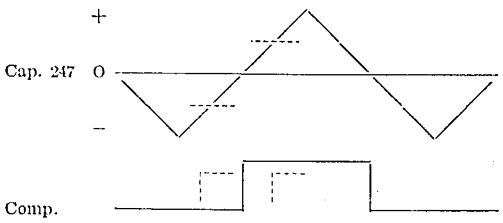

As the phase varies the square wave shifts as shown by the dashed lines.

The differential comparator output is fed to a multiplier which includes inductor 307 and capacitors 308 and 311 which act with transistor301 to multiply by four the square wave output from differential comparator 260 which converting it to a sine wave. The multiplier receives the output of the differential comparator 260 through coupling capacitor 299 to the base of transistor 301 which is also connected to a bleeder resistor 303 to ground. The emitter of transistor 301 is coupled to the negative power supply termanal 253 through resistor 304 and to a bypass capacitor 305 to ground. The collector of transistor 301 is coupled to one end of inductor 307 and grounded variable capacitor 308. The opposite end of inductor 307 is coupled to capacitor 311 to ground and to resistor 309 which is connected to the positive power terminal 249. The output of the multiplier transistor 301 is from its collector through a coupling capacitor 306 to positiver terminal of limiter 54. The positive terminal of limiter 54 is also connected to a bleeder resistor 310.

The sine wave output of the multiplier is converted back to square waves by the limiter 54. The limiter 54, which may be another TI designated SN 52710, receives the multiplier output at its positive terminal; its negative terminal is connected through resistor 313 to ground. Power is supplied the limiter 54 by conductor 315 coupled directly to the positive power supply terminal 249, and through resistor 317 having one end coupled to a bypass capacitor 319 to ground and its other end coupled to resistor 293 having one end connected to the grounded biasing zener diode 297 and its other end to the negative power supply terminal 253. The square wave output of the limiter 54 is fed to the trigger pulse generator 46 for high frequency correction at the phase detector 50.

AUDIO CIRCUIT

The audio circuit 90 (FIG. 1) includes the audio filter 92 for passing only signal waves in the audio band and for stripping off noise components outside the audio band. The output signal from the audio filter is the desired signal which is the input to a superheterodyne audio stage and loudspeaker (not shown). As the audio stage for FM receives are well known to those skilled in the art, no detailed description is provided. Others interested in the audio stage are referred to Volume 3, Van Valkenburgh. Nooger & Neville, Basic Electronics, 1955

Although a preferred embodiment of this invention has been described, it will be apparent to a person skilled in the art that various modifications to the details of construction shown and described may be made without departing from the scope of this invention.

What is claimed is:

1. An electronic receiver comprising:

a. means operatively responsive to a received signal for producing a modulated pulse-space train of signals;

b. a carrier wave filter operatively coupled to the means for producing the mdoulated pulse-space train of signals for attenuating the intermediate frequency carrier wave while passing the dc components, information components, and high frequency noise; and c. a feedback network including a fast acquisition unit circuit and a filter means circuit, the fast acquisition unit circuit and the filter means circuit operatively coupled to the output of the carrier wave filter for producing respectively a dc correction signal, and a high frequency noise suppression signal, said circuits having their outputs operatively coupled to the means for producing the modulated pulse-space train of signals to apply the dc correction signal thereto for locking the receiver to the received signal, and to apply the high frequency noise suppression signal thereto for suppressing any receiver generated noise.

2. An electronic receiver comprising:

a. means operatively responsive to a modulated signal input for producing a modulated intermediate frequency signal;

b. a first filter means operatively coupled to said means for producing the modulated intermediate frequency signal for producing a constant average voltage output;

c. a reference oscillator operatively coupled to a source of power for producing a substantially noise free reference frequency;

d. a summing means operatively coupled to the outputs of the filter means and the reference oscillator to sum the constant average voltage of the filter means with the substantially noise free output of the reference oscillator thereby increasing the amplitude of the signal-to-noise ratio of the resulting modulating intermediate frequency signals;

e. a phase detector means operatively coupled to the output of the summing means and to the output of the reference oscillator for producing output signals proportional to the phase difference of the two signals;

f. a second filter means operatively coupled to the output of the phase detector means to pass as an output the dc component, information component, and high frequency noise while attenuating the intermediate frequency component;

g. means including a fast acquisition unit operatively coupled between the output of the second filter means and means for producing the modulated intermediate frequency signal for producing from the output of the second filter means a dc correction signal for the modulated intermediate frequency to acquire lock; and h. means including a third filter means operatively coupled between the output of the second filter and phase detector means for passing the high frequency component from the output of the second filter to the phase detector means for suppressing any high frequency noise generated in the receiver.

3. An electronic receiver comprising:

a. a modulated signal receiving means for receiving a modulated signal;

b. a frequency down conversion means operatively coupled to the output of the modulated signal receiving means for producing constant average voltage selected sideband IF signals;

c. an oscillator having a terminal for connection to a source of power for producing a substantially noise free frequency reference signal;

d. a summing network opatively coupled to the output of the frequency down conversion means and the output of the oscillator for summing the outputs thereby producing a composite signal to increase the amplitude of the signal-to-noise ratio of the received modulated signal;

e. a phase detector network coupled to the outputs of the summing network and oscillator for detecting the phase difference between the composite signal and reference frequency signal;

f. a carrier wave attenuator coupled to the output of the phase difference detector network for attenuating the carrier wave and passing the dc component, modulating information and high frequency noise; and g. a circuit network including:

i. a first circuit means operatively coupled between the carrier wave attenuator and the frequency down conversion means for producing an adjusted dc voltage for controlling the phase of the intermediate frequency signal output of the frequency down conversion means;

ii. a second circuit means operatively coupled among the carrier wave attenuator, oscillator and phase detector network for passing high frequency noise detected to the phase detector network for suppressing noise in the phase detector network output; and iii. a third circuit means operatively coupled to the output of the carrier wave attenuator for passing the receiver'5 information output signal;

4. An electronic receiver according to claim 3, wherein said frequency down conversion means includes an IF amplifier with gain control and means furnishing a control signal to the IF amplifier for producing a constant average voltage output.

5. An electronic receiver according to claim 3, wherein said summing network is responsive to the IF amplifier output and reference frequency source output to produce a composite signal that is linearly related to the phase angle of the IF signal considered alone at the output of the summing circuit.

6. An electronic receiver according to claim 3 wherein said phase detector network includes a first pulse generating means coupled to the summing network output for producing pulses indicative of the phase angle of the composite signal; a second pulse generating means coupled to the oscillator output for producing pulses indicative of the phase angle of the reference frequency signal output, and a phase detector responsive to the phase indicating pulses to produce a pulse train whose mark-space ratio measures the phase difference between the composite signal and the reference signal.

7. An electronic receiver comprising:

a. a modulated signal receiver means for receiving and amplifying an incoming modulated signal;

b. a first frequency down converting means operatively ocouled to the output of the modulated signal receiver for producing a modulated intermediate frequency signal;

c. a first intermediate frequency amplifier operativelcoupled to the output of the first down converting means for ampifying the modulated intermediate frequency signal;

d. a voltage controlled oscillator operatively coupled to a power source for producing a center frequency offset downwardly from the intermediate frequency of the first intermediate frequency amplifier;

e. a second intermediate frequency down converting means operatively coupled to the outputs of the first intermediate frequency amplifier and the voltage controlled oscillator for mixing the amplifier modulated intermediate frequency with the intermediate frequency signal of the voltage controlled oscillator for further down conversion of the intermediate signal and compression of the modulation index of the signal;

f. a second intermediate frequency amplifier with filter and gain control means operatively coupled to the outputs of the second mixer and a dc reference voltage source for producing an adjusted modulated intermediate frequency signal;

g. a substantially noise free reference oscillator coupled to the output of a source of power for producing a frequency substantially equal to that of the second modulated signal frequency down converting means;

h. a summing means operatively coupled to the outputs of the second intermediate frequency amplifier and the substantially noise free reference oscillator for summing the outputs to increase the amplitude of the signal-to-noise ratio of the modulated intermediate frequency signal;

j. first and second limiters operatively coupled respectively to the outputs of the summing means and the reference oscillator to produce square wave signals;

j. a phase detector means including a first and second trigger pulse producing means operatively coupled, respectively, to the outputs of the first and second limiters to produce a pulse-space train of signals whose space length is equivalent to the phase difference between the incoming modulated intermediate frequency signal and the reference oscillator signal;

k. a carrier wave filter operatively coupled to the pulse-space train output of the phase detector means for attenuating the carrier frequency while passing the dc components, information components, and high frequency noise detected; and l. a circuit network including a first circuit having a fast acquisition unit operatively coupled to the output of the carrier wave filter for producing a dc phase correction voltage coupled to the voltage controlled oscillator, and a second circuit having a phase modulator operatively coupled to the detected high frequency noise output of the carrier wave filter and the reference oscillator for modulating the reference frequency output coupled to the second limiter to suppress noise generated by the phase detector means.

8. An electronic receiver comprising:

a. a modulated signal receiver means for receiving and amplifying a modulated signal;

b. a modulated signal frequency down converting means responsive to the amplified modulated signal to produce an intermediate frequency having a compressed modulation index;

c. an IF amplifier means including a DC voltage connection means, the IF amplifier means responsive to the compressed IF modulated signal and DC voltage connection means to produce an If signal having a constant average voltage;

d. a summing circuit including a reference oscillator having a frequency substantially equal to that of the IF carrier frequency and a summing means responsive to the IF constant average voltage signal of the IF amplifier means and reference frequency of the reference oscillator for increasing the signal-to-noise ratio of the IF signal and producing an IF signal having a sinusoidal waveform;

e. a first square waveform trigger pulse producing means responsive to the sinusoidal waveform output of the summing circuit for producing square wave pulses at the positive transitions of the square waves;

f. a pulse modulator responsive to the reference frequency of the reference frequency oscillator and high frequency noise of the electronic receiver to produce a modulated signal at the IF frequency which is sinusoidal in waveform;

g. a second square waveform trigger pulse producing means responsive to the sinusoidal waveform output of the phase modulator for producing square wave pulses at the positive transitions of the square waves;

h. a phase detector responsive to the square wave pulses of the first and second square waveform trigger pulse producing means for producing a pulse space train whose space length between pulses is equivalent to the phase difference between the IF signal and the reference oscillator signal;

i. a carrier filter responsive to the pulse train output of the phase detector for attenuating the carrier frequency while passing the DC component, information component, and high frequency noise detected;

j. a main feedback loop circuit coupled between the carrier filter and modulated signal down converting means including a fast acquisition unit responsive to the carrier filter output for producing a DC correction signal of the correct sign to facilitate acquiring lock when the system is out of lock and a compensating filter function when in lock for the modulated signal down converting means;

k. an assist loop coupled between the carrier filter and phase detector including a filter amplifier for passing the high frequency noise to the phase modulator for modulation with the reference frequency of the reference frequency oscillator and suppression of the high frequency noise generated by the phase detector; and l. an information retrieval stage including an information filter output to pass the information frequency band, while attenuating noise components outside the information frequency band.

* * * * *